Figure 1:
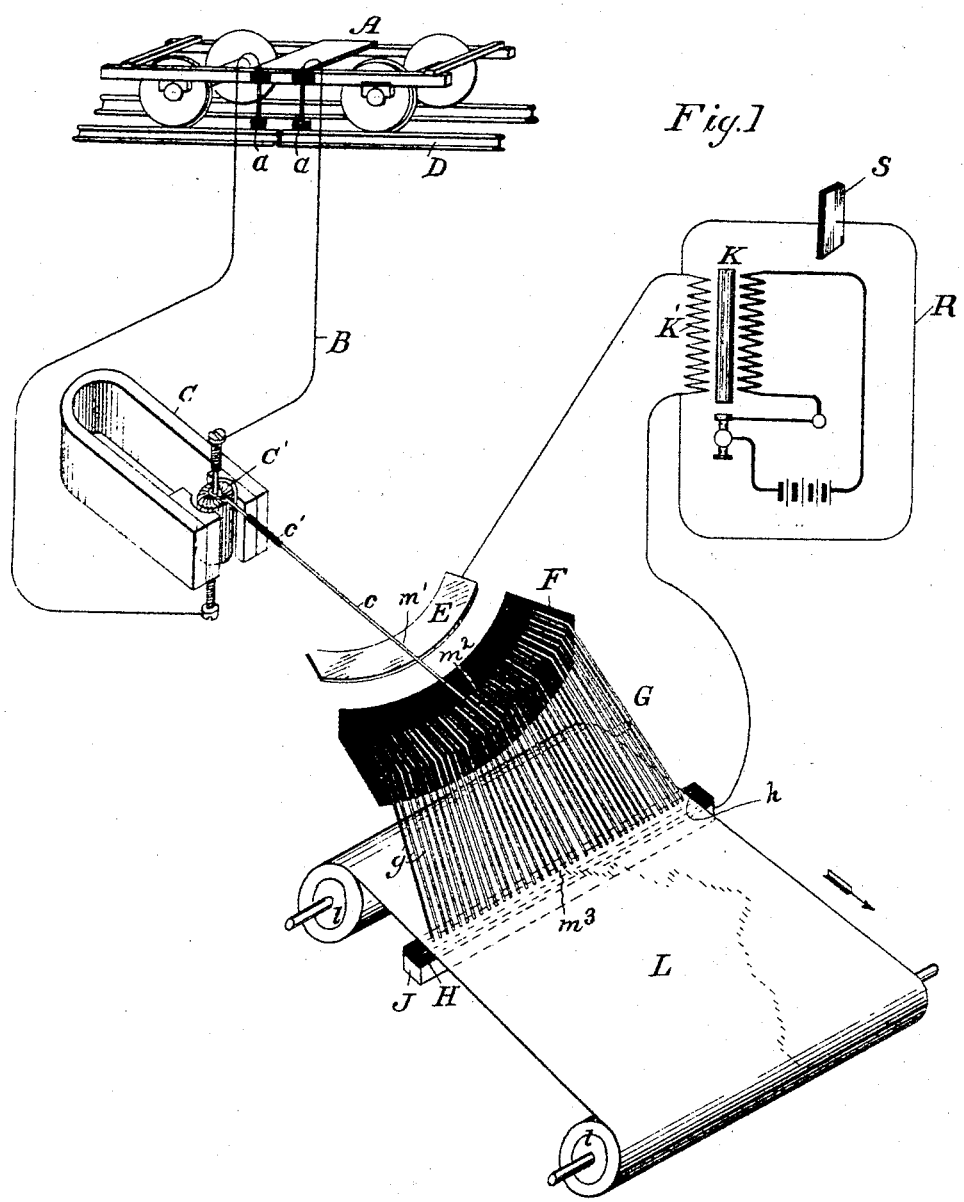

A. B. HERRICK.
RECORDING DEVICE.
APPLICATION FILED MAY 31, 1905.

907,235.

Patented Dec. 22, 1908.

3 SHEETS—SHEET 1.

Witnesses
Jno. F. Oberlin
G. W. Saywell

Inventor
Albert B. Herrick
By his Attorney
J. B. Fay

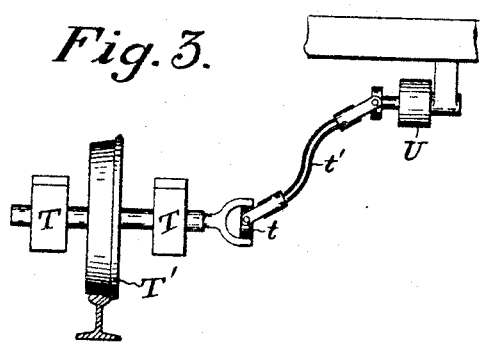
Fig. 3.
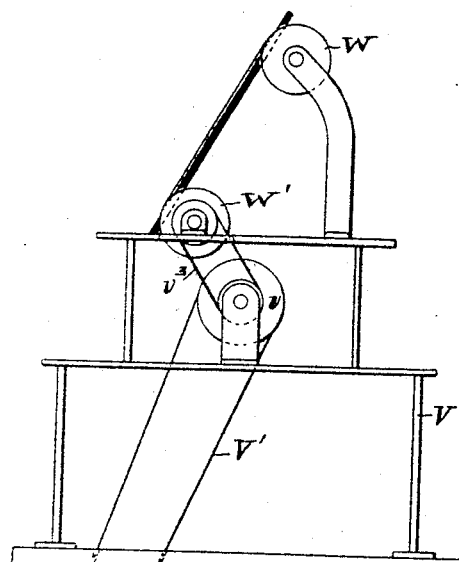
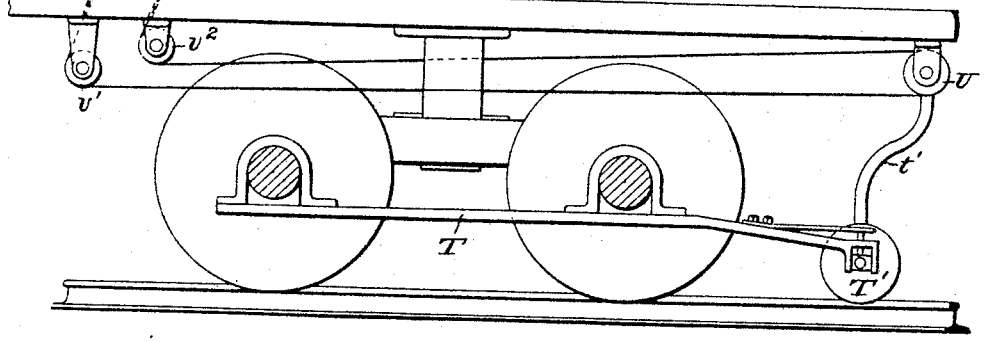
Fig. 4.

UNITED STATES PATENT OFFICE.

ALBERT B. HERRICK, OF RIDGEWOOD, NEW JERSEY.

RECORDING DEVICE.

No. 907,235.  Specification of Letters Patent.  Patented Dec. 22, 1908.

Application filed May 31, 1905. Serial No. 263,176.

*To all whom it may concern:*

Be it known that I, ALBERT B. HERRICK, a citizen of the United States, resident of Ridgewood, county of Bergen, and State of New Jersey, have invented a new and useful Improvement in Recording Devices, of which the following is a specification, the principle of the invention being herein explained and the best mode in which I have contemplated applying that principle, so as to distinguish it from other inventions.

This invention relates to recording devices and has for its objects to enable varying electrical conditions in a circuit to be recorded by passing an electric current through a record sheet.

More particularly the invention consists in an apparatus for producing marks in a record sheet by means of a disruptive or oscillating electric discharge of high tension and low volume as distinguished from apparatus heretofore known wherein a spark of comparatively low tension and large volume is caused to puncture the sheet.

Where the perforation of the sheet is produced by a spark of large volume and relatively low tension, the material of the sheet is burned away, forming a large hole with smooth edges which is difficult to distinguish. so that it has been proposed to use chemically treated papers in which the chemicals would be decomposed to discolor the paper upon the passage of the current. I have discovered that when a current or oscillatory discharge of high tension is passed through a sheet, the destructive effect on the fiber is very much less, while the distortion of the fiber is increased to such an extent that the surface is made rough by reason of the outward displacement of the fibers around the edges of the perforations. In attaining this result, I have provided an apparatus wherein the current which is passed through the record sheet is in the form of an oscillatory discharge of very high tension and low volume. This current is produced by means of a condenser of predetermined capacity connected with the circuit carrying the current which passes through the record sheet to render the circuit resonant. The rapid current oscillations or surgings produced thereby have the effect of distorting and displacing the fibers of the record sheet without burning.

A further feature of the invention consists in the provision of means whereby the vibrating needle used for determining the record will not be retarded by the jumping of the spark, and enabling a more accurate record to be made.

In apparatus heretofore known, there has been a tendency to retardation of the needle by reason of the current tending to maintain a path through the sheet once established in spite of the tendency of the needle to move to establish another path. This has resulted in the production of inaccurate records, because when the needle did overcome the restraining tendency, it would jump beyond the right point, besides burning large holes in the record sheet, but with this invention, these difficulties are overcome. In carrying out this feature of the invention, the magnetically controlled needle is itself preferably made a part of the secondary high tension circuit, and is caused to move over a number of fixed conductors leading to the record sheet, thereby forming a plurality of paths of substantially equal resistance and without any tendency to retard the needle.

A still further feature of the invention resides in the provision of a plurality of air gaps in the secondary circuit, together with means more especially adapted for a track testing equipment, whereby the speed of the record sheet will be proportional to the speed of the car on which the equipment is mounted.

Figure 2:
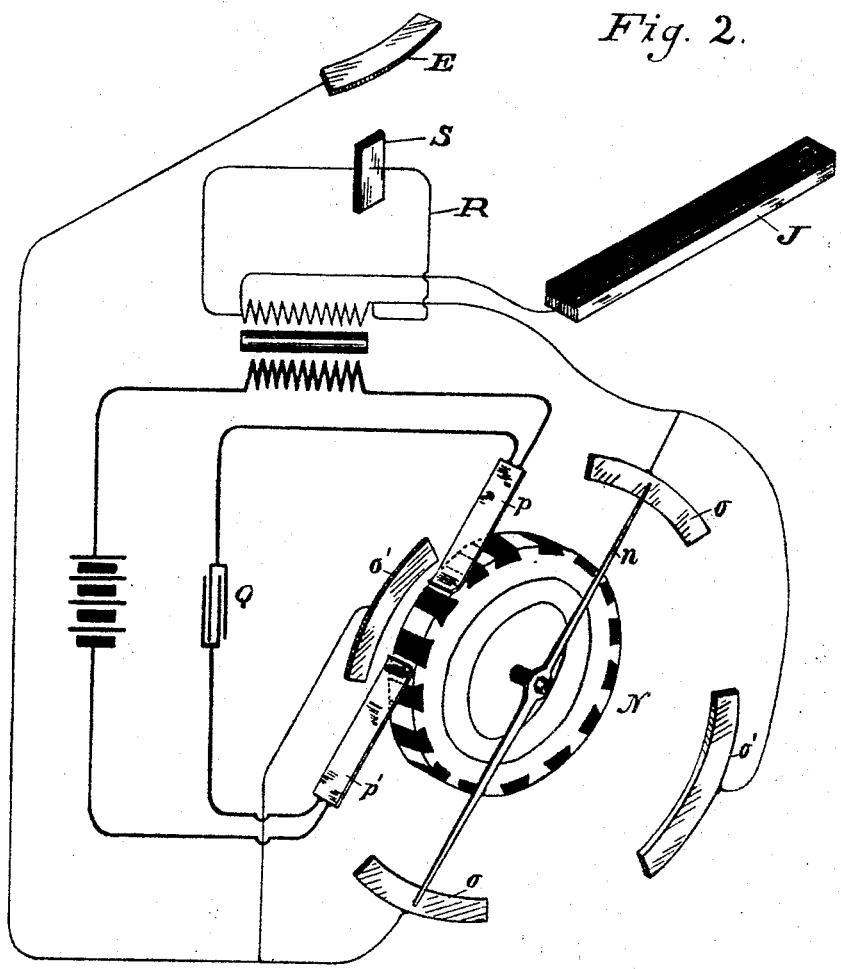

The foregoing and other objects and advantages of the invention, will more fully appear in connection with the description and accompanying drawings, wherein Figure 1 is a perspective view, partly diagrammatical, of the invention. Fig. 2 is a view showing a modified form of interrupting mechanism; Figs. 3 and 4, show the manner of driving the apparatus from a car wheel, to make the speed of the paper proportional to that of the car.

In the illustrated device A represents a car truck which is provided with two brushes *a a* insulated from the truck as shown. These brushes form terminals of a circuit B including the coil C' of a voltmeter C, and are arranged to contact with one of the rails D of the track upon which the truck runs. It will therefore be seen that a difference of potential between the points contacted by the respective brushes will be indicated by the fluctuation of the position of the indicating pointer *c* of the voltmeter, as will be readily understood. The said pointer forms a bridging element in a secondary circuit hereinafter described and is insulated from the coil C' by means of section c' of broom straw or other suitable insulation. Substantially parallel with the plane of movement of said pointer, contiguous thereto but out of contact therewith, is a metallic plate E preferably curved as shown, and extending through the arc of oscillation of the needle. Upon the support F of insulating material, are secured a multiple series of conductors G of non arcing metal, as brass, insulated from each other, whose upper ends are located in a plane substantially parallel with the plane of movement of the end of the pointer c and arranged radially at equal distances upon the arc of a circle having its center in the pivot of said pointer. The lower ends of these conductor elements $g$ terminate in the same plane, and are arranged upon a straight line substantially parallel with the plane of movement of said pointer, their lower ends being equidistant from each other, as shown. Contiguous to said lower ends is a strip H of insulating material having a slot $h$ parallel with the series of said lower conductor ends and extending slightly beyond the end members of the series as shown. This strip is supported by a metallic bar J, also of non arcing material which covers the lower side of the strip under the slot. The bar J and plate E are respectively connected with a high tension current producing device K. As illustrated herein, the secondary circuit of an induction coil constitutes such device K, the said bar being connected with the ends of the secondary coil K' as shown. Interposed between the lower ends of conductor elements $g$ and the strip H, is a sheet of paper L which is mounted upon rollers $l\ l$, so as to be movable in a direction transverse relatively to the direction of movement of the pointer. Any suitable means may be provided for effecting a uniform rotation of the rollers to effect a uniform movement of the paper past the ends of said conductors.

Where the device is used for the graphic recording of the differences of potential at the rail joints, that is the testing of rail bonds for defective conductivity, the rollers are connected, by any suitable mechanism, with a wheel running upon the track such as one of the truck wheels, or a separate wheel may be provided, as will be readily understood. In this manner, positive means are provided for effecting a movement of the paper such as will maintain a constant relationship between the speed of the car and the rate of movement of the recording sheet. The latter may be of paper or other material capable of being distorted by a high tension disrupting current.

The paper may be kept out of or in contact with the ends of the conductors but rests and slides upon the insulating strip H. It will therefore be seen that three spark gaps are formed, namely, $m'$, $m^2$, $m^3$, Fig. 1, $m'$ being about four times the length of $m^2$, for the best results.

Current being passed through the high tension circuit it will be seen that a spark will be produced at said three points $m'$, $m^2$, $m^3$, that at $m^3$, perforating the paper and imparting a permanent visual alteration to its surface. The location of such alteration in the surface of the paper will be determined by the position of the pointer $c$, such position determining the particular conductor element $g$, which will be selected as the path of the high tension current and to which such current will be diverted. Such position of the pointer at any particular instant corresponds with and is determined by the character of the condition to be recorded at such instant, and the number of calibrating points which can be recorded practically corresponds with the number of elements $g$, different characters of conditions imparting different positions to the pointer. Throughout a given movement of the pointer, the current and spark passes from the pointer to the proximate conductor elements $g$, so that successive different paths for the current are presented, each one of which presents the same conditions of resistance at the spark gaps. Such arrangement prevents the spark from lagging, dragging, or tending to maintain a previously established low resistance path, and so disguising a true record as a result of its tendency to maintain a path once established. By providing a multiplicity of selective conductor elements, which can be increased or decreased according to the accuracy required of the desired record, each time the spark passes from one element to the next, and the record sheet having moved, the conductive conditions previously established are destroyed, the original condition of resistance is reëstablished and such tendency to maintain the established path is destroyed. Each position of the pointer is thus indicated accurately by a corresponding perforation of the paper, such perforation having definite positions on lines running transversely of the direction of movement of such paper. The multiple arc conductors $g$ may be hence regarded as means having equal resistance for interrupting the current; the exercise of the function of such means being, however, dependent upon the movement of the pointer.

The apparatus as thus far described effects its purpose satisfactorily when the conditions to be recorded are constantly varying. When the conditions for recording which demand high speed or a practically instantaneous record, however, are constant through extended periods and the pointer is in consequence for a period quiescent, the constant passage of the spark at the point $m^3$, will generate an amount of heat such as to burn the paper and so produce a perforation of a size such as will diminish the accuracy of the record. To obviate such defect, I provide means for periodically and regularly interrupting the spark current independently of the pointer. Such means and its relation to the above described mechanism is illustrated in Fig. 2, and consists of the rigid interrupter N provided with a connecting or distributing arm $n$, a series of disconnected contacts $o$, $o$, and $o'$, $o'$ and two brushes $p$ and $p'$. Opposite contacts $o$ and $o$ are respectively connected with the spark plate E and one end of the secondary coil K' of the induction coil, the opposing contacts $o'$ and $o'$ being similarly connected as shown. The other end of the said coil is, as before explained, connected with the bar J, the brushes being included in the primary circuit of the indicator coil. A suitable condenser Q is connected across the brushes as shown to satisfy the electrical requirements established by the above described construction, as will be readily understood by those skilled in the art. The interrupter N is rotated by any suitable means (not shown) such as an electric motor. By means of such arrangement it will hence be seen that the spark current is periodically interrupted by the periodic opening and closing of the secondary circuit, and in case the pointer $c$ be stationary, such interruption will prevent heat generated by a spark at $m^3$, from unduly charring or burning the paper. A clean well defined line of small perforations will thus be described on the paper from which the variations of the electric conditions in rail bonds may be determined.

In the particular application of my invention to the testing of rail bonds or joints, the above described apparatus is provided in duplicate for the other rail. I have found however that in order to make the record produced as above described clearly legible there must be established two paths from the inductorium producing the induced high potential current, one circuit containing the spark gaps between the plate E and pointer $c$ and between the latter and commutator segments $g$, $g$, and also between the segments, record sheet L and bar J. The sum of these gap resistances must be balanced by a capacity across the path of the induced current such as will render the same resonant and produce a disruption in the sheet by an oscillating discharge, instead of a mere perforation with destruction of the material of the sheet. The required capacity is determined empirically for each device. Such effect is produced, I have found, by providing a circuit R in multiple with the secondary circuit of the induction coil K and including in such circuit a condenser S, having the necessary capacity. The effect of the addition is to increase the intensity and disrupting effect, but decrease the volume and destructive effect of the induced current, so that the material will be upset and raised above the surface, rather than burned away. In consequence, with a fibrous paper, a very distinct lesion of the paper is made. Heretofore I have found it most preferable to use a very thin "parchmentized" paper in which the fiber has, during the course of the paper's manufacture, been broken down into molecular as distinguished from fibrous form. The result has been, where no disrupting or oscillating discharge was used, a series of perforations which could sometimes only be distinguished through the medium of direct rays of transmitted light. It has also heretofore been found necessary to limit the relative speeds of the indicating pointer and recording paper in order to obtain a record by such means. By means of my improved apparatus, producing the disrupting discharge upon opening the high tension circuit, no such limitation is necessary, so that the speed with which the record can be made can be greatly increased.

As previously stated, Fig. 4, represents a diagrammatic view of one form of driving mechanism and supporting parts for the paper record sheet. Upon one of the trucks of the car is secured, in any suitable manner, the frame T, which includes bearings for the axle of a jockey wheel T'. This axle is connected, by means of a universal joint $t$ with a flexible shaft $t'$. The other end of said shaft is connected with the shaft of a pulley U which shaft is mounted in a suitable bearing secured to the bottom of the frame of the car. Upon a frame V, mounted upon the car and supporting the recording mechanism (not shown in this view) is a pulley $v$, and a belt V' passes around pulley $v$ and drives the same, suitable guiding pulleys $v'$ and $v^2$ being provided at the required locations. A feed roll W, containing the roll of record paper, is mounted upon frame V, and said paper is fed to and upon a second roll W', which latter is driven by a belt $v^3$ driven by pulley $v$, as shown and as will be readily understood. It will therefore be seen that when the jockey wheel engages a rail during the travel of the car, a definite and constant relationship is maintained between the rates of movement of the record sheet and the car.

From the foregoing description it will be seen that an apparatus is produced wherein the current producing the record is of an oscillatory or a surging character, as distinguished from the currents produced by the secondaries of ordinary induction coils in the constructions heretofore known. By reason of such oscillatory or disruptive current having a very high tension and low volume, the burning effect on the sheet is very greatly reduced, and instead the fibers of the sheet are bodily displaced and distorted and left in such condition as to be visible to the eye. Furthermore, it will be seen that by the apparatus herein described there is no tendency of lagging or dragging of the spark on the needle, so that the needle is at all times free to move in response to electrical conditions of the circuit being recorded. Furthermore, by periodically interrupting the circuit the burning of the sheet by continued discharges through the same perforation is prevented. The apparatus as herein described may be modified in various particulars without departing from the scope of the invention, and is not to be limited to the precise construction shown.

Having thus described my invention, I declare that what I claim as new and desire to secure by Letters Patent, is:

1. The combination with a secondary circuit having a plurality of air gaps, of a movable record sheet passing across one of the gaps in said circuit, a needle moving through one of said other gaps in response to varying electrical conditions, a capacity in said circuit such as to balance said air gaps and render said circuit resonant, and means for intermittently inducing a current in said circuit.

2. The combination with a secondary circuit having a plurality of spark gaps, of a capacity connected in said circuit such as to balance said spark gaps and render the circuit resonant, a needle in said circuit moving in one of said spark gaps and responsive to variation in electrical conditions, a record sheet of parchmentized paper movable across another of said spark gaps, and a primary circuit.

3. The combination with an induction coil having a primary circuit, and a secondary circuit including a plurality of spark gaps, of a capacity connected in said secondary circuit such as to balance said spark gaps and render the circuit resonant, a needle forming a portion of said secondary circuit and responsive to varying electrical conditions, a plurality of multiple arc conductors over which said needle moves, and a record sheet movable in an air gap between said conductors and the remainder of the circuit.

4. The combination of a movable record sheet, a high tension circuit containing a capacity and having a plurality of air gaps in series, a needle responsive to electrical variations and forming a portion of the circuit between two of said air gaps, a series of separated conductors over which said needle moves without contacting, said conductors leading to an air gap including the record sheet, a slotted support for the record sheet, and a conductor leading from the support in said high tension circuit.

5. The combination with a movable record sheet, of a secondary circuit having a plurality of spark gaps, one of said spark gaps having a plurality of terminals, said sheet passing across another of said gaps, a movable needle controlling the passage of disrupting current through said sheet, means for changing said first spark gap from one to another set of terminals to mechanically interrupt the secondary circuit and prevent holding of the needle, and means for inducing a current in said secondary circuit.

6. The combination with a movable record sheet, of primary and secondary circuits, said secondary circuit containing an interrupter and a plurality of spark gaps, said sheet passing across one of said gaps, a needle controlling the passage of disrupting current through said sheet according to its position, and a capacity in said secondary circuit connected across said spark gaps, and of such proportion as to make said circuit resonant.

7. The combination with a vehicle and a relatively fixed conductor, of means for recording circuit variations in said conductor, comprising a movable needle and devices controlled thereby for disrupting, by a high tension current, a movable sheet at points corresponding to the position of the needle, means whereby the speed of the sheet varies with the speed of the vehicle, and means for interrupting the high tension circuit to prevent retardation of the needle, substantially as described.

8. In recording mechanism, the combination of circuit-connections including two contact brushes attached to a car and adapted to engage a rail at two successive points, a volt meter in said circuit, circuit connections including a device for generating a high tension spark current and including the voltmeter pointer, a record sheet interposed between two terminals in said latter circuit connections, and means for positively moving said sheet during the movement of the car, such sheet moving means arranged to operate at a speed having a constant relationship relatively to the car speed.

9. The combination with a secondary circuit including a plurality of spark gaps, of a capacity connected in said circuit whereby to render it resonant, a record sheet movable across one of said spark gaps, an electro-responsive needle moving in one of said air gaps, and determining the passage of the current through the record sheet, mechanical means for periodically opening the secondary circuit, and means for inducing a current in said circuit.

10. The combination with a primary circuit and an interrupter therein, of a secondary circuit having an interrupter therein moving out of step with the interrupter in the primary circuit for periodically opening the secondary circuit, a movable record sheet interposed in the secondary circuit, and a vibratory needle controlling the passage of current through the record sheet.

11. The combination with an induction coil having an interrupter and a condenser in the primary circuit, of a secondary having a plurality of air gaps and a capacity therein to render the same resonant, means independent of the primary interrupter for periodically interrupting the secondary circuit, a record sheet in one of said air gaps, and an electro-responsive needle controlling the passage of current through the sheet.

Signed by me, this 19th day of May 1905.

ALBERT B. HERRICK.

Attested by—
M. I. MAHLSTEDT,
MABEL O. FAHNESTOCK.